United States Patent [19]

Danko

[11] Patent Number: 4,917,357

[45] Date of Patent: Apr. 17, 1990

[54] DIAPHRAGM VALVE

[75] Inventor: Oliver L. Danko, Chesterland, Ohio

[73] Assignee: Nupro Company, Willoughby, Ohio

[21] Appl. No.: 391,188

[22] Filed: Aug. 8, 1989

Related U.S. Application Data

[63] Continuation-in-part of Ser. No. 249,386, Sep. 26, 1988.

[51] Int. Cl.[4] .................. F16K 7/16; F16K 31/50; F16K 43/00
[52] U.S. Cl. .................. 251/331; 137/315; 251/274; 251/214
[58] Field of Search ............... 137/315; 251/214, 331, 251/335.2, 333, 264, 267, 268, 273, 274

[56] References Cited

U.S. PATENT DOCUMENTS

| | | | |
|---|---|---|---|
| 2,323,531 | 7/1943 | Franck | 251/331 |
| 2,388,989 | 11/1945 | Mueser | 251/331 |
| 2,654,559 | 10/1953 | Franck | 251/331 |
| 2,939,676 | 6/1960 | Kilcoin | 251/331 |
| 4,070,004 | 1/1978 | Friswell | 251/331 |
| 4,671,490 | 6/1987 | Kolenc et al. | 251/335.2 |
| 4,750,709 | 6/1988 | Kolenc et al. | 251/335.2 |

FOREIGN PATENT DOCUMENTS

| | | | |
|---|---|---|---|
| 795145 | 3/1936 | France | 251/331 |
| 918546 | 2/1947 | France | 251/331 |

Primary Examiner—George L. Walton
Attorney, Agent, or Firm—Fay, Sharpe, Beall, Fagan, Minnich & McKee

[57] ABSTRACT

A diaphragm valve includes a valve body adapted to receive a replaceable diaphragm subassembly. The subassembly includes a sleeve closely received in the valve body. An actuating stem extends through the sleeve and includes a composite diaphragm welded at one end. An intermediate portion of the stem is threadedly received in a closure ring. The closure ring defines a radial gap with a closing cap to permit adjustment of the stem relative to a valve seat. A peripheral portion of the composite diaphragm is clampingly engaged between the valve body and sleeve. The composite diaphragm includes a metal layer having an elastomer bonded to one face to provide superior sealing and strength properties.

14 Claims, 3 Drawing Sheets

DIAPHRAGM VALVE

This is a continuation-in-part of co-pending application Ser. No. 249,386, filed on Sept. 26, 1988.

BACKGROUND OF THE INVENTION

This invention pertains to the art of fluid valves and more particularly to a diaphragm valve.

The invention is particularly applicable to a diaphragm valve for use in biotechnological applications and will be described with particular reference thereto. However, it will be appreciated that the invention has broader applications and may be advantageously employed in other environments and applications.

Prior diaphragm valves have been deficient in two primary areas, namely, (i) cycle life and (ii) ease of maintenance and/or replacement. Cycle life is closely dependent on the strength of the diaphragm, particularly the flexural strength of the diaphragm. Some prior valves have utilized a metallic diaphragm due to its high strength. Other valves have utilized an elastomeric diaphragm due to its superior flexure and sealing properties. Still others have attempted to strengthen elastomeric-type diaphragms through use of a composite diaphragm having elastomers of different strengths.

Even with continued improvements in diaphragm valve designs, overall cycle life is still dependent on the strength of the diaphragm. Oftentimes, the remainder of the valve components still have a substantial useful life but changeover or replacement of the worn component, i.e., the diaphragm, is still necessary. Prior arrangements simply have not adequately addressed the problem of repeated maintenance or replacement. That is, if the valve must be repaired or replaced the various valve components have not been designed to aid in cleaning, replacement, and subsequent reassembly.

Another frequently encountered problem is the limited space availability for the valve in the associated fluid system. Typically, process lines of the fluid system are closely spaced together or positioned closely adjacent other equipment or structures. A valve can only occupy a minimum amount of space and must be compact enough to operate in hard-to-reach places. Thus, compactness is another primary requirement in valve design without comprising valve performance.

SUMMARY OF THE INVENTION

The present invention contemplates a new and improved diaphragm valve that has an increased cycle life and facilitates maintenance and/or replacement.

According to the present invention, a diaphragm valve includes a valve body receiving a diaphragm subassembly therein. The diaphragm is a composite member comprised of a metallic base to which an elastomer is bonded.

According to another aspect of the invention, the diaphragm subassembly includes a sleeve receiving an actuating stem therethrough. The diaphragm is secured adjacent one end of the sleeve and has a central portion welded to the stem. An annular closure ring is received at the opposite end of the sleeve and includes a threaded portion for receiving an intermediate portion of the stem. A cap engages a second end of the sleeve for securing the subassembly to the valve body.

According to another aspect of the invention, a guide member is interposed between the stem and subassembly sleeve to maintain accurate, linear movement of the stem.

According to an alternate aspect of the invention, a ring is received in the body and cooperates with a pair of annular members also disposed in the body and a closure cap to substantially reduce the axial dimension of the valve.

A principal advantage of the invention resides in the increased cycle life of the valve due to the composite diaphragm assembly.

Another advantage of the invention is found in the ease of cleaning or replacement due to the diaphragm subassembly.

Yet another advantage of the invention is the compact arrangement of an alternate valve construction.

Still other advantages and benefits of the invention will become apparent to those skilled in the art upon a reading and understanding of the following detailed description.

BRIEF DESCRIPTION OF THE DRAWINGS

The invention may take physical form in certain parts and arrangements of parts, preferred embodiments of which will be described in detail in this specification and illustrated in the accompanying drawings which form a part hereof, and wherein.

DETAILED DESCRIPTION OF THE PREFERRED EMBODIMENTS

Figure 1:
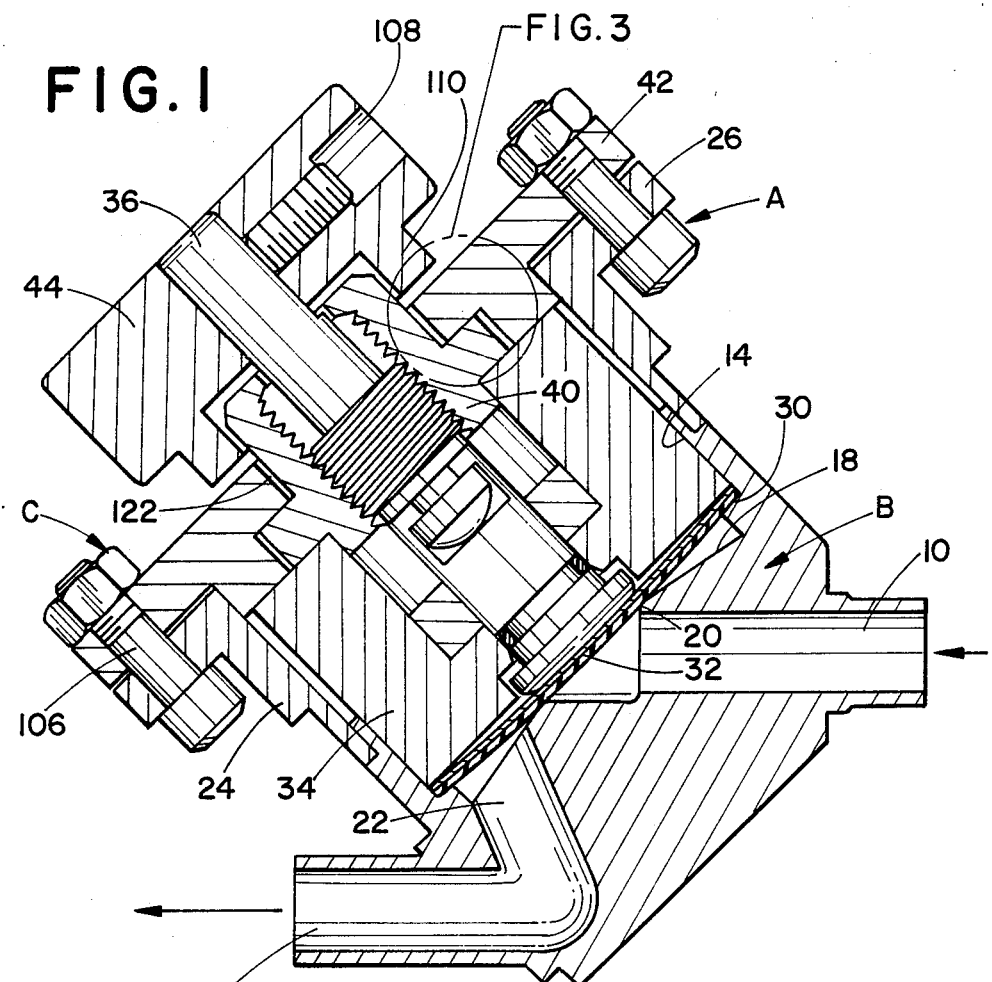
FIG. 1 is a vertical, cross-sectional view of the subject new valve illustrated in a closed position.

Referring now to the drawings wherein the showings are for purposes of illustrating the preferred embodiments of the invention only and not for purposes of limiting same, the FIGURES show a diaphragm valve A having a valve body B that receives a diaphragm subassembly C.

More particularly, the valve body includes an inlet passage 10 and outlet passage 12 that communicate with an enlarged recess 14. As illustrated, the inlet and outlet passages are disposed generally horizontally and communicate with the recess that is angularly disposed relative to a horizontal plane. The intersection of the inlet passage with a bottom wall 18 of the recess defines a valve seat 20. In the preferred arrangement, the bottom wall has a tapering or partial conical configuration such that the valve seat is positioned at a raised central region for reasons which will become more apparent below. The outlet passage is disposed below the inlet passage thus requiring a generally vertically extending, passage portion 22 to interconnect the outlet passage with the recess. Positioning the outlet passage below the inlet passage enhances drainability.

The valve body is a two-part, integral construction comprising a main valve body 24 and a body extension 24'. The body extension includes a generally radially extending, circumferentially continuous flange 26 that assists in valve makeup as will be described further below. The body extension and valve body are typically welded together although it is contemplated that the valve body and body extension may be a unitary cast member as will be understood by one of ordinary skill in the art. A generally radially extending shoulder 30 is defined in the valve body recess. The shoulder is spaced axially outward from the tapering base wall 18 a dimension slightly greater than the valve seat 20 for reasons which, again, will become more apparent below.

With continued reference to FIG. 1, and additional reference to FIG. 2, the diaphragm subassembly C will be described in greater detail. Specifically, the subassembly includes a composite diaphragm 32, a subassembly sleeve 34, two-part actuating stem 36, guide member 38, annular closure ring 40, closure cap 42, and handle 44. The assembly components may be secured together as a unit to facilitate changeover or replacement of a used subassembly.

The composite diaphragm includes a metallic diaphragm 50, preferably stainless steel. A first or upper face 52 of the metallic diaphragm is secured along a central region to the actuating stem 36. For example, the stem and diaphragm may be spot welded together. The second or lower face 54 of the metallic diaphragm is integrally bonded to an elastomeric diaphragm 56. The diaphragm 56 may be formed of EP rubber or similar elastomeric material. The integral bonding of the individual diaphragms provides a composite diaphragm assembly that is greatly increased in strength, yet retains the sealing qualities of an elastomeric member.

The subassembly sleeve 34 has an outer peripheral dimension closely approximating the inner diameter of the valve body recess. This provides for a close fit relationship that aligns and stabilizes the subassembly relative to the valve body. A bore 60 closely receives the actuating stem through the sleeve. On a first or lower end 62 of the sleeve is provided a counterbore 64 that receives an enlarged end of the actuating stem. The radial shoulder defined by the counterbore serves as a valve stop limiting opening movement of the diaphragm valve as will be understood by those skilled in the art. A second counterbore 66 extends axially inward from a second or upper end 68 of the sleeve. The second counterbore closely receives the guide or bushing member 38 therein. The bushing member has an inner diameter substantially identical to that of bore 60 to assure a smooth, linear movement of the actuating stem.

First or lower portion 74 of the actuating stem includes an inverted, generally T-shaped groove 76 that receives a lower end of the second portion 78 of the stem. Particularly, a generally spherical nose 80 of the stem second portion abuttingly engages the stem lower portion to urge the stem and diaphragm to a closed position with the valve seat 20 and without transmitting torque from the handle 44. Radial shoulder 82 defined adjacent the nose portion cooperates with the reduced diameter portion of the T-shaped groove to urge the lower portion of the stem and diaphragm away from the valve seat during valve opening movement.

The stem is externally threaded at 86 for cooperation with an internally threaded region 88 of the closure ring 40. Rotation imparted to the actuator stem advances and retracts the stem relative to the closure ring and sleeve to open and close the valve in a manner well known in the art. The closure ring includes a reduced diameter, axially extending portion 90 adapted for mating receipt in the second counterbore 66 of the sleeve. This facilitates positive location of the second portion of the stem relative to the stem lower portion 74. Additionally, a radially extending flange 92 is clampingly received between the cap 42 and subassembly sleeve to axially secure the closure ring in the subassembly.

The cap 42 also includes an axially extending portion 98 that abuttingly engages the upper end of the housing. A radial inner portion 100 overlies the flange 92 of the closure ring while a radial outer portion 102 cooperates with the body extension flange 26. Means for securing the subassembly to the valve body is defined by a series of fasteners 106 circumferentially arranged around the valve and interconnecting the flanges 26 and 102 of the body extension and cap.

The handle 44 is secured to the upper portion of the stem 48 by means of a set screw 108. This connection ensures that rotation of the handle is effectively transmitted to the actuating stem for reciprocating motion of the diaphragm toward and away from the valve seat 20 as described above. An integral sleeve 110 extends axially downward from the handle for surrounding relation with the closure ring 40. The sleeve 110 serves a protective function limiting dirt and debris from entering the closure ring and interfering with the threaded regions 86, 88.

Figure 2:
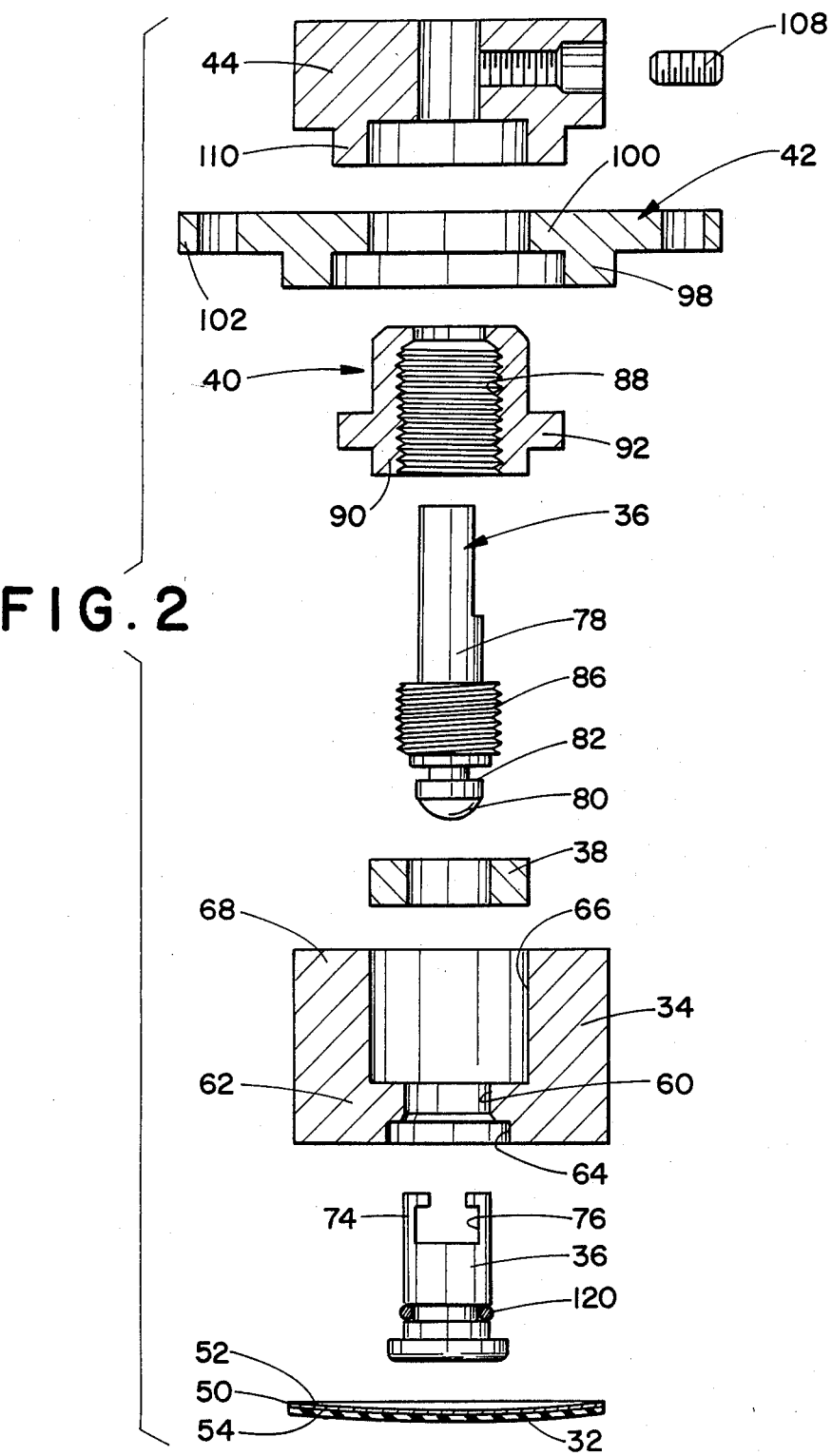
FIG. 2 is a vertical cross-section, exploded view of the diaphragm subassembly.

The subassembly as illustrated in FIG. 2 may be readily inserted into the recess 14 of the valve body. The sleeve 34 and recess shoulder 30 clampingly engage a peripheral portion of the composite diaphragm therebetween. The clamped arrangement defines a primary sealing region of the diaphragm valve. A backup or secondary seal member 120 is interposed between the actuating stem and sleeve. As is apparent, rotation of the handle axially advances or retracts the stem and central portion of the composite diaphragm toward and away from the valve seat. This structural arrangement provides positive diaphragm advancement and positive diaphragm retraction to insure precise open and closed positions.

As described above, the subassembly construction aids in maintenance and replacement of the diaphragm. Specifically, the valve body remains secured to the fluid system and the diaphragm subassembly is easily removed and inserted. Due to tolerance variations, it is important that some play remain in the subassembly to orient movement of the stem relative to the valve seat 20. Preferably, axial movement of the actuating stem will be precisely aligned with the center of the inlet passage so that the composite diaphragm will seat evenly on the valve seat. As is particularly noted in FIG. 3, a radial gap 122 is defined between the closure ring 40 and cap 42. The gap permits slight radial or lateral adjustment of the closure ring prior to final tightening of the fasteners so that the axis of the actuating stem is accurately aligned relative to the valve seat.

Figure 3:
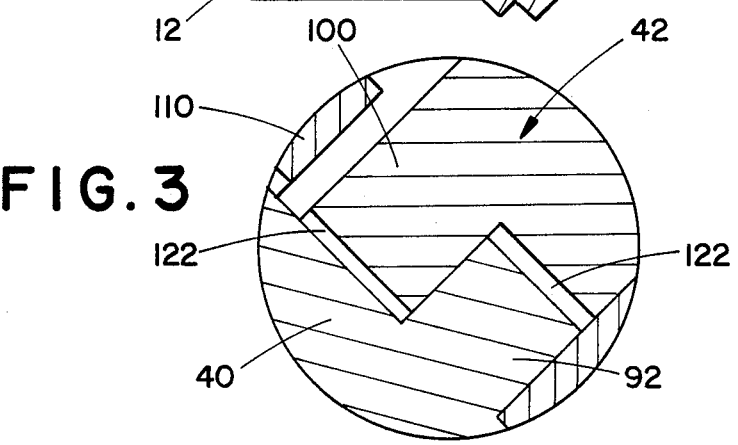
FIG. 3 is an enlarged detailed view of the encircled area of FIG. 1 particularly illustrating the adjustment feature of the subject invention.
Figure 4:
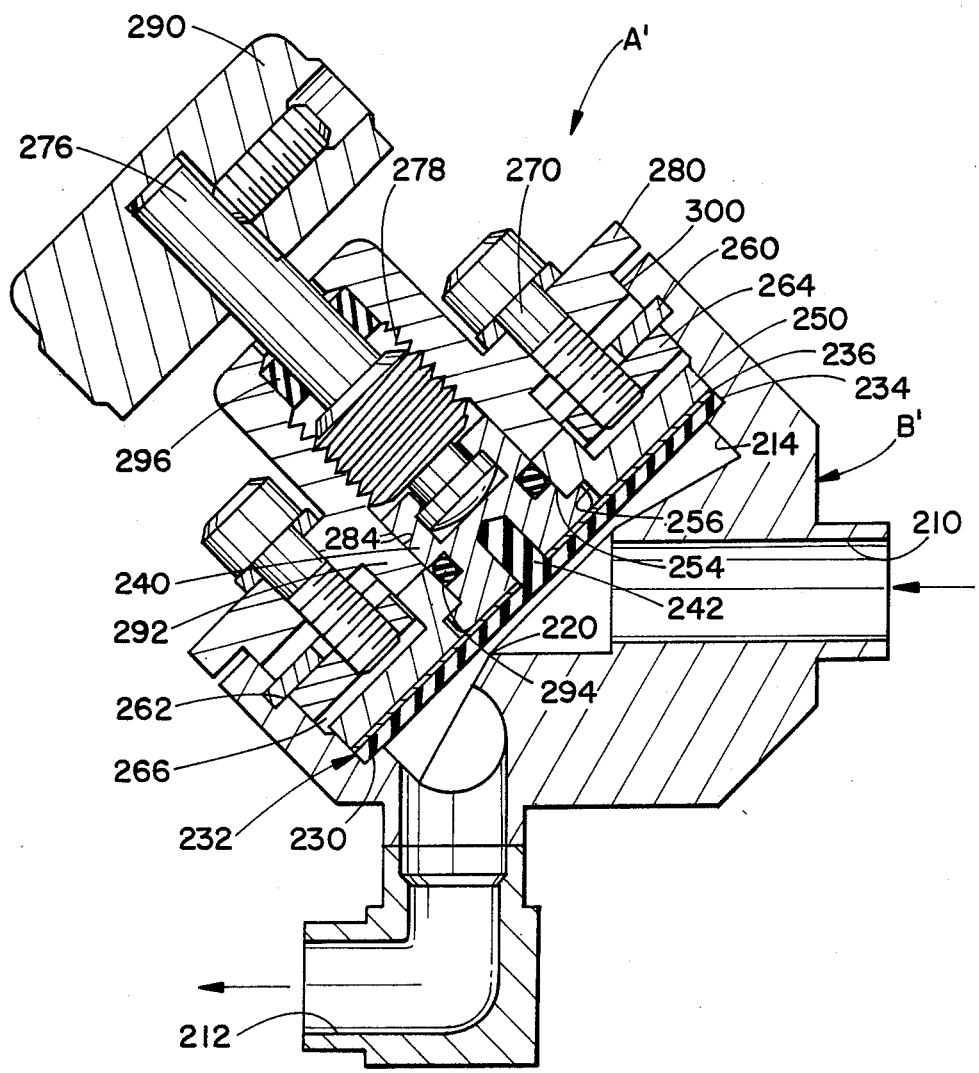
FIG. 4 is a vertical cross-sectional view of an alternate embodiment of the subject invention.

Turning now to FIG. 4, an alternate arrangement of the diaphragm valve is illustrated. For purposes of brevity and to facilitate an understanding relative to the embodiment of FIGS. 1-3, like terminology is used whereever possible to describe the elements of the alternate diaphragm valve A'. A valve body B' has an inlet 210 that selectively communicates with an outlet 212 through a recess 214. A valve seat 220 is defined at the intersection of the inlet with the recess and as described with reference to the FIGS. 1-3 embodiment, the inlet, outlet, recess, and valve seat are configured to enhance drainability of the valve.

A continuous shoulder 230 is defined in the recess and adapted to receive a peripheral portion of the composite diaphragm 232. The composite diaphragm includes a first layer 234 of elastomeric material that faces toward the valve seat. A second layer 236 is preferably a metallic material to provide strength and durability. The first and second layers are bonded together to define an integral structure.

According to this embodiment, the metallic second layer is initially secured to a lower end 240 of a two-part actuating stem. Preferably, the metallic layer is welded to the stem lower end although it will be recognized that other securing arrangements can be utilized without departing from the scope and intent of the invention. Thereafter, the elastomeric first layer 234 is integrally bonded to the first layer. As is apparent in FIG. 4, the metallic layer of the composite diaphragm is annularly shaped to accommodate a plug 242 of elastomeric material that extends from the first layer, through the diaphragm second layer, and into a cavity in the lower end of the stem.

A sleeve or first annular member 250 is received in the recess and clampingly engages the composite diaphragm along a peripheral portion against shoulder 230. The annular member is dimensioned for close receipt in the recess and in some respects is comparable to the sleeve of the above described embodiment but is substantially reduced in axial dimension. Specifically, the annular member is disk-shaped with an axial extension 252 extending outwardly from one face of the disk. The annular member includes a bore or through opening 254 that receives the lower end of the stem therethrough. A counterbore 256 extends axially inward from the bore and defines a radial shoulder serving as a stop limit to opening movement of the stem.

A retaining ring 260 is snap-fit into groove 262 defined in the recess at a region disposed axially outward from the shoulder 230. The ring provides a secure mounting area for maintaining the valve components secured to the body in a much more compact arrangement. A second annular member 264, also referred to as a clamp ring, is axially positioned between the ring 260 and the annular member 250. A gap 266, though, is defined between the first and second annular members. The second annular member includes circumferentially spaced threaded openings 268 adapted to receive fasteners 270 to permit adjustment of the clamping force on the diaphragm as will become more apparent below.

The fasteners extend from threaded engagement with the second annular member and through the central opening of the ring 260. The outermost end of the fasteners are enlarged for transferring the clamping forces to closure cap or bonnet 280. In fact, support rings may be interposed beneath the enlarged ends of the fasteners to more effectively convey the clamping forces to the closure cap.

The closure cap has a central opening 284 that receives the stem therethrough. Specifically, the stem lower end 240 is guided for reciprocating axial movement in the opening. An upper end 276 of the two-part stem is threadably engaged with an interiorly threaded region 278 of the opening to convert rotary movement imparted to the stem through handle 290 to axial movement of the actuating stem and diaphragm. Means for limiting the transfer of torque from the stem upper end to the stem lower end is identical to that described above with reference to the FIGS. 1-3 embodiment so that further discussion is deemed unnecessary with respect to the FIG. 4 arrangement.

The closure cap includes an axially extending nose portion 292 that abuttingly engages the axial extension 252 of the first annular member and defines an annular cavity therebetween. The cavity, in turn, receives the ring 260, the second annular member 264 and fasteners 270 therein. This transfers the clamping forces to the first annular member, particularly the peripheral portion thereof, to clamp the composite diaphragm against the shoulder 230. Thus, to summarize, the fasteners are tightened relative to the second annular member. The forces on the second annular member are resisted by the ring 260 due to its fixed engagement through groove 262 with the body. The fasteners transfer the forces through the closure cap which, in turn, transfers the clamping forces to the first annular member.

A secondary or backup seal is defined by the O-ring 294 radially interposed between the stem lower portion and the first annular member. As described above, the diaphragm defines the primary seal for the valve in addition to regulating communication between the inlet and outlet. A wiper ring 296 is disposed axially outward of the threaded region 278 of the closure cap. The wiper ring retains the thread lubricant in the closure cap and also limits ingress of dirt and particulate from the outside environment into the valve.

To facilitate alignment of the stem, the closure cap and body are provided with cooperating locating surfaces represented by reference numeral 300. The locating surfaces assure that the closure cap and, more importantly, the stem outer end are aligned relative to the valve seat.

This alternate embodiment retains all of the benefits of the FIGS. 1-3 embodiment with additional advantages of its own. Among the improvements, the alternate embodiment is much more compact. The external mounting of the bolts is eliminated which reduces the overall radius of the valve structure. The axial dimension of the valve is also reduced as a result of the internal means for transferring clamping forces to the diaphragm. Additionally, manufacture and assembly of the diaphragm valve is substantially simplified with this structure.

The invention has been described with reference to the preferred embodiments. Obviously modifications and alterations will occur to others upon a reading and understanding of this specification. It is intended to include all such modifications and alterations in so far as they come within the scope of the appended claims or the equivalents thereof.

Having thus described the invention, it is now claimed:

1. A diaphragm valve comprising:
    a body having a recess, and an inlet and outlet operatively communicating across a valve seat defined therein;
    a circumferentially continuous shoulder defined in said body;
    a composite diaphragm received in said body and clampingly engaged to said shoulder;
    an annular member closely received in said valve body and engaging said diaphragm along a peripheral portion thereof against said shoulder;
    an actuating stem having a first end secured to said diaphragm and a second end extending outwardly through the annular member and said annular member being in engagement with said second end;
    a closure cap adapted to close the recess, said cap having an extending portion that engages the annular member for defining a cavity therebetween;
    a ring axially received in said recess between the annular member and the closure cap; and means extending through the closure cap into the cavity and through said ring for axially transferring forces from said ring to said annular member to permit a desired clamping of the diaphragm against the shoulder.

2. The diaphragm valve as defined in claim 1 wherein said force transferring means includes a second annular member axially disposed between the annular member and the ring.

3. The diaphragm valve as defined in claim 2 wherein the second annular member operatively engages an inner face of the ring.

4. The diaphragm valve as defined in claim 3 wherein the force transferring means includes an adjustable fastener extending between the second annular member and the closure cap.

5. The diaphragm valve as defined in claim 3 wherein the force transferring means includes an adjustable fastener that extends from the second annular member, through the ring, and to the closure cap.

6. The diaphragm valve as defined in claim 1 further comprising means for limiting torque transfer along the actuating stem.

7. The diaphragm valve as defined in claim 6 wherein the torque limiting means is interposed between the first and second ends of the stem, the first end of the stem adapted for both rotary and axial movement, and the second end adapted for axial movement only.

8. The diaphragm valve as defined in claim 1 further comprising a backup seal means interposed between the actuating stem and the annular member.

9. The diaphragm valve as defined in claim 1 wherein the composite diaphragm includes an elastomeric layer facing the valve seat for selectively opening and closing communication between the inlet and outlet.

10. A diaphragm valve comprising:
a body having a recess, and inlet and an outlet selectively communicating across a valve seat disposed in a recess;
a composite diaphragm received in the recess for selective movement toward and away from the valve seat;
a first annular member disposed along a rear face of the diaphragm sealingly clamping a peripheral portion of the diaphragm to the body;
a closing cap at least partially received in the recess and engaging the first annular member for defining a cavity therebetween;
an actuating stem extending through the closing cap, the stem having a first end secured to the diaphragm without extending therethrough and a second end cooperating with the closing cap to advance and retract the stem relative thereto;
a ring secured to the body within said cavity between the first annular member and the closing cap;
a second annular member axially interposed between the ring and first annular member, the second annular member abuttingly engaging the ring for transferring clamping forces from the body through the ring to the second annular member; and
means for transferring clamping forces from the second annular member to the closing cap which transfers desired clamping forces to the first annular member and the peripheral portion of the diaphragm to the body.

11. The diaphragm valve as defined in claim 10 further comprising a secondary seal member received on the outer periphery of the stem.

12. The diaphragm valve as defined in claim 10 wherein the clamping forces transferring means includes a fastener extending axially outward from the second annular member through the ring to the closing cap.

13. The diaphragm valve as defined in claim 10 further comprising a locating surface defined on the body for aligning the closing cap and the actuating stem for linear movement perpendicular to the valve seat.

14. The diaphragm valve as defined claim 10 further comprising means for limiting transfer of torque from the second end of the stem to the first end of the stem.

* * * * *